United States Patent
Renfro et al.

(10) Patent No.: US 7,630,987 B1
(45) Date of Patent: Dec. 8, 2009

(54) SYSTEM AND METHOD FOR DETECTING PHISHERS BY ANALYZING WEBSITE REFERRALS

(75) Inventors: Chadwick R. Renfro, Midlothian, TX (US); Daniel Shnowske, Midlothian, TX (US); Brian R. Wacker, Dallas, TX (US)

(73) Assignee: Bank of America Corporation, Charlotte, NC (US)

(*) Notice: Subject to any disclaimer, the term of this patent is extended or adjusted under 35 U.S.C. 154(b) by 359 days.

(21) Appl. No.: 10/904,708

(22) Filed: Nov. 24, 2004

(51) Int. Cl.
*H04L 9/00* (2006.01)

(52) U.S. Cl. .................... 707/10; 713/161; 713/165; 713/153; 709/219

(58) Field of Classification Search ............... 705/50, 705/15; 726/22; 713/176, 200; 707/6, 3
See application file for complete search history.

(56) References Cited

U.S. PATENT DOCUMENTS

| | | | |
|---|---|---|---|
| 6,349,309 B1* | 2/2002 | Aggarwal et al. ........... 707/200 |
| 6,442,606 B1* | 8/2002 | Subbaroyan et al. ........ 709/224 |
| 6,684,254 B1* | 1/2004 | Dutta .......................... 709/229 |
| 7,117,385 B2* | 10/2006 | Chokshi et al. .................. 714/5 |
| 7,200,584 B2* | 4/2007 | Sakurai ......................... 706/58 |
| 7,290,131 B2* | 10/2007 | Beynon et al. ............... 713/153 |
| 2002/0178155 A1* | 11/2002 | Sakurai ........................... 707/3 |
| 2003/0014331 A1* | 1/2003 | Simons ....................... 707/100 |
| 2003/0023687 A1* | 1/2003 | Wolfe .......................... 709/206 |
| 2003/0023878 A1* | 1/2003 | Rosenberg et al. .......... 713/201 |
| 2003/0028774 A1* | 2/2003 | Meka .......................... 713/176 |
| 2003/0101234 A1* | 5/2003 | McBrearty et al. .......... 709/218 |
| 2003/0105739 A1* | 6/2003 | Essafi et al. .................... 707/1 |
| 2003/0120647 A1* | 6/2003 | Aiken et al. ..................... 707/3 |
| 2004/0078422 A1* | 4/2004 | Toomey ....................... 709/202 |
| 2004/0153365 A1* | 8/2004 | Schneider et al. ............. 705/14 |
| 2004/0267929 A1* | 12/2004 | Xie .............................. 709/225 |
| 2005/0015626 A1* | 1/2005 | Chasin ......................... 713/201 |
| 2005/0021997 A1* | 1/2005 | Beynon et al. ............... 713/200 |
| 2005/0076222 A1* | 4/2005 | Olkin et al. .................. 713/176 |
| 2005/0097107 A1* | 5/2005 | Burt ............................ 707/100 |
| 2005/0120006 A1* | 6/2005 | Nye ............................... 707/3 |
| 2005/0120039 A1* | 6/2005 | Amys et al. ................. 707/102 |

(Continued)

OTHER PUBLICATIONS http://truefresco.org/referrers.htm, published Apr. 1, 2004, p. 1.*

*Primary Examiner*—John R. Cottingham
*Assistant Examiner*—Sherief Badawi
(74) *Attorney, Agent, or Firm*—Michael A. Springs; Moore & Van Allen PLLC

(57) ABSTRACT

System and method for identifying phishers by analyzing website referrals. A combination of statistical analysis and fingerprinting can be used to assign a relevance score to a referring website that indicates the likelihood that the referring website is a phishing-related website. A fingerprint as used herein with respect to example embodiments is an array of relevant points corresponding to defined HTML tags. The relevance score can be determined at least in part by comparing the fingerprint of a suspect website with that of a base website. The number of matches in relevant points between the two websites determines the relevance score. Provisions can be made for displaying, reporting, and tracking relevance scores so that appropriate actions can be taken as phishing is detected. Additionally, a known-good list of websites can be used to reduce the number of false positives.

18 Claims, 5 Drawing Sheets

U.S. PATENT DOCUMENTS

| | | | |
|---|---|---|---|
| 2005/0210043 A1* | 9/2005 | Manasse | 707/100 |
| 2005/0257261 A1* | 11/2005 | Shraim et al. | 726/22 |
| 2006/0021031 A1* | 1/2006 | Leahy et al. | 726/22 |
| 2006/0036693 A1* | 2/2006 | Hulten et al. | 709/206 |
| 2006/0041508 A1* | 2/2006 | Pham et al. | 705/50 |
| 2006/0041754 A1* | 2/2006 | Hind et al. | 713/176 |
| 2006/0068755 A1* | 3/2006 | Shraim et al. | 455/410 |
| 2006/0123478 A1* | 6/2006 | Rehfuss et al. | 726/22 |
| 2007/0101423 A1* | 5/2007 | Oliver et al. | 726/22 |

* cited by examiner

```
function fingerprint($url){
  echo "<br><a class=grey>Fingerprinting base site $url
</a>";flush();
$id = "xxxxxxx";
$cnt_tmp=0;
$repeat=1;
$passwd = "xxxxxxx";
$l_url = $url;
while($repeat==1):
      $cnt_tmp++;
      if($cnt_tmp>2){
          $repeat=0;
      }
      $url_data = download_pretending($l_url,$id,$passwd);
      $allowed_tags = "<img>";
      $url_data = strip_tags($url_data,$allowed_tags);
      $url_data = preg_replace("/src=/","",$url_data);
      $url_data = preg_replace("/;|}|\"/"," ",$url_data);
      $url_data = preg_replace("/\//","\/",$url_data);
      $url_array = explode(" ",$url_data);
      $url_array = preg_grep("/.*http.*/",$url_array);
      $url_array = array_unique($url_array);
      $url_data = preg_replace("/;|}|\"/","",$url_data);
      $url_data = preg_replace("/\//"," ",$url_data);
      $url_data = explode(" ",$url_data);
      $url_data = array_unique($url_data);
      $fl_array = preg_grep("/.*\.gif|.*\.cgi/",$url_data);
      $merged_array= array_merge($url_array,$fl_array);
      $cnt_merged = count($merged_array);
      if($cnt_merged > 5){
          $repeat=0;
      }
      echo "<br><tab><a class=grey>Identified ".
count($merged_array) ." relevant points for
comparision</a>";flush();
endwhile;
foreach($merged_array as $x){
     if (preg_match("/\s/", $x)) {
         continue;
     }
     $array[]=$x;
}
echo "<a class=grey>(Complete)";flush();
return($array);
}
```

SYSTEM AND METHOD FOR DETECTING PHISHERS BY ANALYZING WEBSITE REFERRALS

BACKGROUND

Identity theft victimizes millions of people each year and costs businesses billions of dollars. Internet-based identity theft is a type of Internet fraud that is increasingly viewed as a significant threat to consumers and businesses. Two interrelated methods of carrying out this Internet fraud are called "phishing" and "spoofing."

Phishing is a term coined by hackers who generate e-mails that imitate legitimate e-mails from businesses or other organizations to entice people to share personal information, such as passwords, credit-card numbers, account information, etc. Phishing involves the distribution of fraudulent e-mail messages with return addresses, links, and branding that appear to come from banks, insurance agencies, or other legitimate businesses. Victims typically receive an e-mail telling them they must supply some personal information to the sender via return e-mail or using a web link.

Spoofing, as the term is applied to the web, refers generally to the practice of setting-up an illegitimate website that is designed to appear like a legitimate and reputable website. Such illegitimate websites typically present on-line forms for entering personal information, which is then stored and used by the operator of the illegitimate website for nefarious purposes.

The information gathering success of spoofing alone depends on web surfers randomly, often accidentally, browsing to the spoofing site, thus, effectiveness for the hacker is limited. However, when spoofing is combined with phishing, so that e-mails from the illegitimate website operator contain links to the illegitimate website, the spoofing gathers much more information for the hacker, since there is a mechanism to direct consumers to the illegitimate website in greater numbers. The illegitimate website in such a case can be referred to as a "phishing-related" website. Such websites often contain links to legitimate websites of the business being spoofed. In many cases, the phishing-related website directs the victim to the legitimate main website of the business being spoofed in order to further enhance the illusion of legitimacy.

SUMMARY

The present invention, as exemplified in the example embodiments disclosed, can aid in the detection of phishers by determining when a website or websites which refer or link to a legitimate target website are probably phishing-related websites. Embodiments of the invention can use a combination of statistical analysis of website referral logs and a technique referred to herein as "fingerprinting" to assign a relevance score to a referring website that indicates the likelihood that the referring website is a phishing-related website. Provisions are made for displaying, reporting, and tracking relevance scores so that appropriate actions can be taken as phishing is detected.

Embodiments of the invention can facilitate detection of phishing-related web sites from among a list or log of referring websites by first producing a dataset of suspect web sites. The dataset can be a referral list straight from referral logs for a target website, or a statistically or otherwise reduced list of websites from referral logs for the target website. A referring site fingerprint is constructed for each of the suspect websites in the dataset based on the content of the suspect website. Each referring site fingerprint is compared to a base site fingerprint for a target website (the legitimate website to which the suspect website refers). A relevance score can then be calculated to indicate the likelihood that the suspect web site is a phishing-related website. This list can be reviewed and appropriate action taken. False positives can be added to a "known-good" list.

In at least some embodiments, the reduced dataset of suspect web sites can be created by first accessing a referral list of websites, typically in the form of target site referral logs. Known good websites can be discarded. Statistical outliers can then be calculated based on historical patterns of referrals. The statistical outliers then form the dataset of suspect websites to be fingerprinted.

In example embodiments a fingerprint is an array of relevant points corresponding to defined HTML tags. Fingerprints can be compared by determining the number of matches between the array of relevant points for the suspect website and a second array that forms or corresponds to the base or target website fingerprint. A large number of matches between the two arrays indicates a greater likelihood that the referring, suspect website is phishing-related.

In example embodiments, the invention is implemented via computing or instruction execution platforms and appropriate software or computer program code instructions. These instructions may be in the form of a computer program product, which is installed to run on appropriate hardware. A system operating to carry out an embodiment of the invention can include a data reduction function to access a referral log of websites and to discard known good web sites, as well as a data repository to store information on historical patterns of website access. A data qualification function can be operatively linked to the data reduction function to compute statistical outliers from the referral log to produce the dataset of suspect web sites. A prioritization and comparison function can construct a referring site fingerprint for a suspect web site and compare the referring site fingerprint to a base site fingerprint to calculate a relevance score. System interfaces can be provided for reporting of metrics and tracking of historical data, as well as to an investigations reporting system. Web services can be used to present reports of suspect websites and relevance scores. The combination of hardware and software to perform the functions described can in some embodiments form the means to carry out the processes described herein.

BRIEF DESCRIPTION OF THE DRAWINGS

FIG. 4 is a pseudo-code listing describing the fingerprinting related aspects of example embodiments of the present invention.

DETAILED DESCRIPTION

The present invention will now be described in terms of specific, example embodiments. It is to be understood that the invention is not limited to the example embodiments disclosed. It should also be understood that not every feature of the methods and systems described is necessary to implement the invention as claimed in any particular one of the appended claims. Various elements and features of various embodiments are described to fully enable the invention. It should also be understood that throughout this disclosure, where a process or method is shown or described, steps of the method may be performed in any order or simultaneously, unless it is clear from the context that one step depends on another being performed first. Also, time lags and waiting intervals between various steps or sub-processes of a method can vary.

It may be helpful for the reader to understand the meaning of a few terms and phrases as used throughout this disclosure, from the beginning. The meaning of other terms and phrases are as would be understood by those of ordinary skill in the art, or will be made clear as they are used. Note that the terms "website" and "web page" may be used interchangeably herein. A base or target website is a legitimate website or web page to which phishers may link to add legitimacy to their efforts. In many cases, this is the main web page or one of the main web pages for a company, for example, "www.abcorporation.com" or the like. In the example embodiments described here, assuming "ABC Corporation" wants to try to detect phishing attempts, this might be the target site used in their analysis. A referring or referral website or web page is any web page that links to this target site, whether the referring website is legitimate or not. A referral list or referral log of websites is a listing of referral websites that have actually linked to the target site during a specified time period.

A "suspect" web site is any website that is to be analyzed by the fingerprinting technique disclosed herein for consideration as a phishing-related website. It is possible to treat an entire referral list or referral log as a list of suspect websites. In the embodiments disclosed herein though, a larger referral list or log is typically reduced to a smaller number or "dataset" of referral websites to analyze. This may be done in various ways, but in example embodiments herein, it is done by either eliminating "known good" or "known safe" web sites taken from a database, by computing statistical outliers in terms of the number of referrals or "hits" from a referral web site during a specified time period as compared to previous similar time periods, or both.

Figure 3:
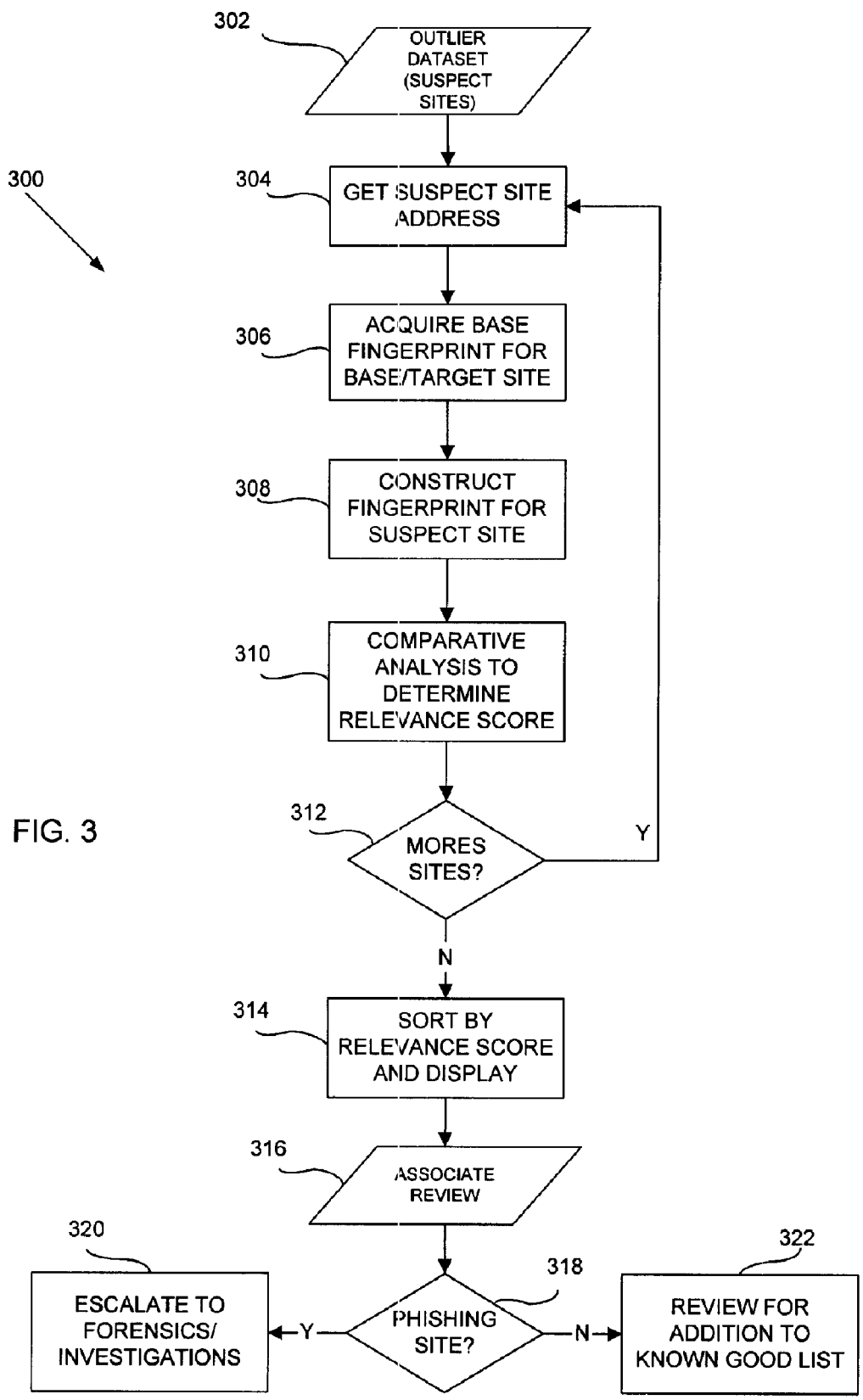
FIG. 3 is a more detailed flowchart illustrating at least some embodiments of the present invention.

Embodiments of the present invention operate in part by doing comparative analysis between two website "fingerprints," the nature of which is discussed in detail relative to FIGS. 3 and 4. A relevance score is produced for a given website. This score indicates the percentage match between the suspect web page, and the base or target web page. The suspect website fingerprint can be referred to as a "referring site fingerprint" and the target site fingerprint can be referred to as a "base site fingerprint." Since a spoofing web page will typically look like the legitimate web page it's designed to imitate, a high relevance score indicates a greater likelihood of the referring site being a spoof or "phishing-related" web page. Note that analysis based only on computing statistical outliers based on historical patterns could provide some assistance in detecting phishing. However, a web site with only very few sudden referrals over time, which would be a statistical outlier based on historical data, could easily be legitimate, for example, a new website, or a personal website of a customer. Such a web page would not typically produce a high relevance score in the appropriate fingerprint comparison.

Figure 1:
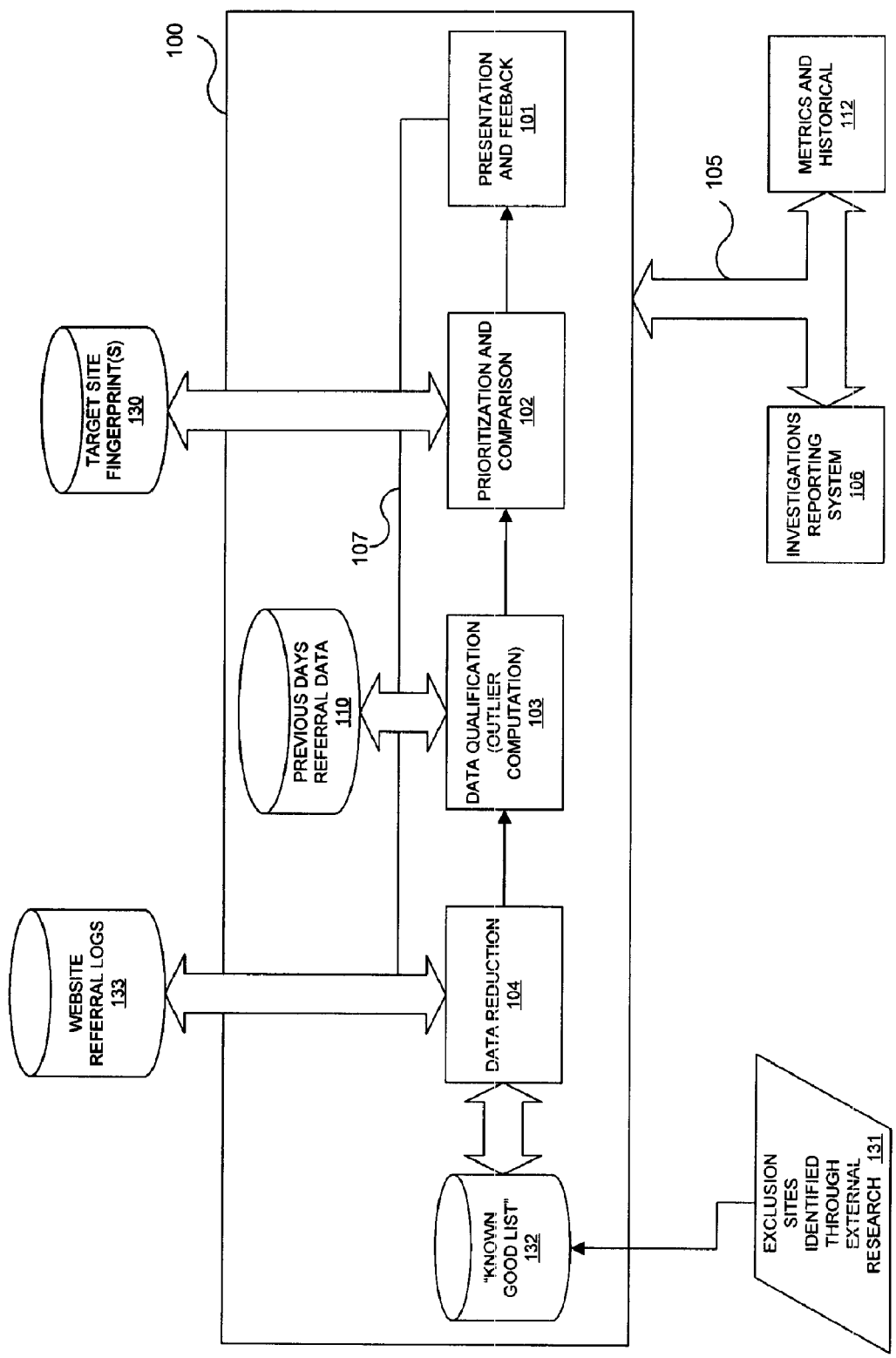
FIG. 1 is a system block diagram illustrating how various functions and databases can be assembled to implement example embodiments of the invention.

FIG. 1 provides a block diagram of the functional elements of an embodiment of a system for detecting phishing by finding phishing-related websites using referral log data from a target or base website. System 100 in example embodiments includes multiple programmatic functions. Presentation and feedback system 101 is a web element that presents relevance score results from prioritization and comparison function 102. Prioritization and comparison function 102 constructs a referring site fingerprint for a suspect website or web page and compares that fingerprint to the appropriate target site fingerprint to calculate a relevance score. This process is normally carried out for all suspect websites in a dataset that is received from data qualification function 103. Data qualification function 103 computes statistical outliers from the referral logs. Data reduction function 104 removes known good websites from the website referral list. Interface 105 connects to various external systems, for example, investigations reporting system 106. Procedure calls 107 link the various programmatic functions of system 100. The investigations reporting system 106 may be an ad hoc system of escalating incidents or any commercial or in-house developed system for assigning workflow for investigation of possible phishing-related sites.

System 100 also includes or has interfaces for various databases or data stores. Historical pattern data and information is maintained in data store or database 110 for use in the outlier computations carried out by function 103. In example embodiments, this data consists of, at least in part, numbers of referrals or hits from referral web sites each day (or other time period) over some past number of days or time periods. A large change in hits from a referring website, or a new website showing up can be indicative of a problem. External metrics and reporting system 112 typically includes its own databases and can be used to maintain similar data as well as other information over a longer or other period of time for metric and tracking purposes. For example, metrics and reporting system 112 can provide for metrics describing trends in phishing, number of phishing-related sites, unusual referral patterns, and repeat offenders.

Target site fingerprints can be stored in database 130 as shown in FIG. 1. These fingerprints can be re-calculated and updated as needed, even as new fingerprints are needed for specific calculations for new referral sites. As previously mentioned, a "known good" list can be used by data reduction function 104 to eliminate known good web sites from the referral list and thus reduce processing effort and the occurrence of false positives. This list can initially be populated by sites discovered through external research, as shown at block 131. In the example of FIG. 1, the list is stored and maintained in database 132. System 100 may be used to integrate referrals to any chosen target site using fingerprint data 130, provided that referral log data from that web site can be obtained from external database 133. The fingerprinting and log analysis functions can be designed to be flexible to deal with multiple reporting and website referral log formats.

In example embodiments, the known good list is a flat file. This list can be combined with referral log data 133 in the data reduction function 104, in part through retrieving referral log data through an external network. The data from database 133 can be provided to system 100 at fixed intervals. Note that according to the example of FIG. 1, some databases are internal and others are external. This choice is somewhat arbitrary, and a system could be designed by persons of skill in the art with various architectures, including all or none of the needed databases or data stores being external or internal to system 100.

Figure 2:
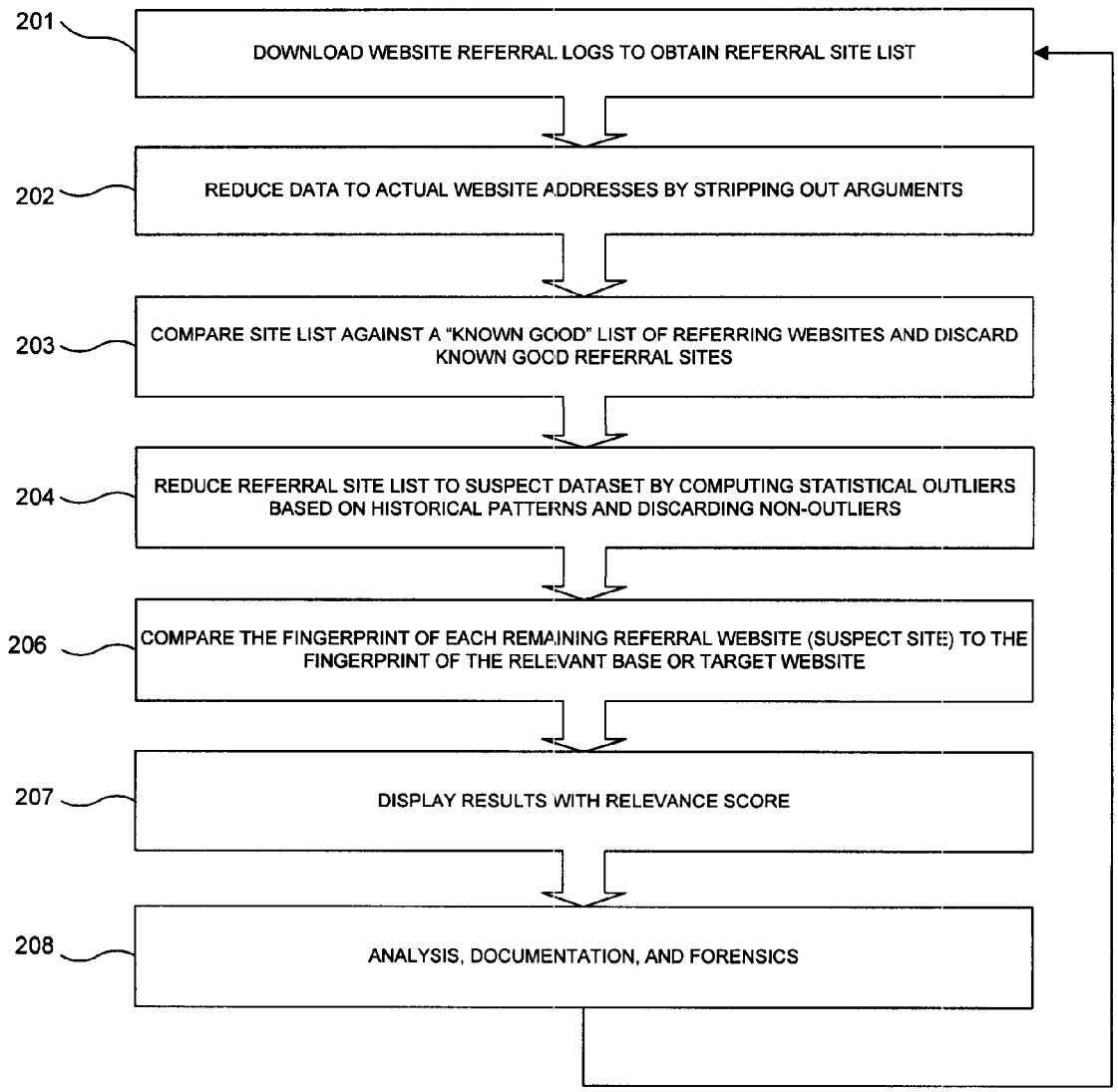
FIG. 2 is a flowchart illustrating a process according to some embodiments of the invention.

FIG. 2 is a flowchart style diagram that illustrates one example embodiment of a method, 200, in which a website referral analysis system can obtain referral site logs for a target web page, analyze the data and output a prioritized list of potential phishing-related sites based on statistical and analytic data. Like many flowchart style diagrams, the flowchart of FIG. 2 presents a process as a series of subprocesses or process blocks. At block 201 website referral logs are downloaded for a targeted website using any available transport media to a centralized server. The data from the logs forms an initial referral site list. At block 202, referral logs are stripped to only include the applicable website addresses. Any arguments after the website address are discarded. At block 203, the list is reduced by comparing websites against the "known good" list of referring websites. The websites on the known good list are websites that are known NOT to be malicious or phishing-related sites.

At block 204, the resultant site list is reduced to a suspect site dataset for fingerprinting by computing statistical outliers from the reduced site list. Sites that are not statistical outliers are excluded. In at least some embodiments, statistical outliers are referring websites that have not been found before. Other statistical criteria can be used instead of or in addition to this criterion. For example in some embodiments, outliers can be determined based on a cutoff value of 1.5 times the inter-quartile range. If the number of hits from a referring site in a relevant time period is greater than (Q3-Q1) times 1.5, or in another formulation, three times the inter-quartile (IRQ), it can be considered an outlier.

At block 206 of FIG. 2 each qualified referral website is considered a suspect site and is compared against the target site by ascertaining fingerprints for the two sites and comparing the fingerprints. The fingerprinting and comparison techniques are discussed in greater detail below with respect to FIGS. 3 and 4. At block 207 results are displayed with a relevance score, which in example embodiments, is a percent that a given referring website matches the target website. Thus, at block 208, analysis, documentation, and possibly forensics can be carried out, in at least some embodiments, with input from an associate or employee of the institution or business making use of the invention. In a typical installation, the processing described above repeats at some interval, as illustrated by the return arrow running from block 208 to block 201.

FIG. 3 is another flowchart, which illustrates further details of the fingerprint comparison and reporting portions of the methods according to example embodiments of the invention. Again, process 300 of FIG. 3 is illustrated as a series of process blocks. At block 302, the outlier dataset of suspect websites is fed into process 300. In this example, this data has been reduced from what was received from the website logs as previously described herein. At block 304 the process operates on a selected suspect website address. At block 306, a base fingerprint for the appropriate target site is acquired. The base fingerprint may be simply looked up in the appropriate data store, or created as needed. At block 308, the referring site fingerprint for the suspect site currently being examined is constructed. At block 310, the fingerprints are compared and this comparative analysis determines the relevance score. This relevance score indicates the likelihood that the suspect website being analyzed is a phishing-related website. At block 312, if there are more suspect web pages in the dataset, processing returns to block 304 and the process repeats as a loop. Otherwise, processing continues to block 314 where site addresses are displayed for associate review as described below.

In at least some embodiments, after all of the comparative analysis is complete, the site addresses are sorted by relevance at block 314 of FIG. 3 and displayed for review by an employee or information technology associate of the enterprise using the invention. At block 318, for each scored, suspect site, the person analyzing sites based on prioritization of relevance score can determine whether a relevant referring website is a phishing site or not. Phishing sites can be escalated to a forensics and/or investigations group at block 320. Optionally, non-phishing sites are analyzed and, if necessary, added to the list of "known good" websites at block 322.

The following is an example embodiment of the fingerprinting and comparison process. The referral analysis fingerprinting technique uses unique hypertext markup language (HTML) tags within an HTML page to build a "fingerprint" of a particular webpage. By comparing the identified tags of a base webpage against the tags in a suspect web page, a percentage match based on a number of matching tags can be computed. This percentage match can be used to rank the criticality of a match for use in prioritizing and follow-up. The fingerprinting comparison process includes three parts: base site acquisition and construction, suspect site acquisition and construction, and comparative analysis.

For the base or target site portion of the process, the base website (the one being compared to any suspect websites) is downloaded (acquired) into memory and assigned to a variable as pure text HTML. An example of a portion of such text is:

<p>Bank website</p>
<img src="banklogo.jpg">

This text is then reduced by stripping out all data EXCEPT for specific pre-defined tags. As an example, IMG, SCRIPT, and HTML tags can be used. Only the relevant object data is retained. Thus, the reduced HTML text for this example may look like:

"banklogo.jpg"

This raw, reduced, data represents a single point of reference in the base site fingerprint. In example embodiments, tags are chosen so that an HTML page that is fingerprinted usually contains 7 to 10 of these relevant data points. The example above only contains one relevant point for illustrative purposes. These points are collected together to construct an array and the array is stored. Base websites may be fingerprinted in advance or at relatively infrequent intervals and the fingerprints can be stored in a database such as that shown in FIG. 1. Alternatively, the fingerprints can be constructed each time they are needed.

As previously shown, the suspect websites are downloaded (acquired) into memory and assigned to a variable as pure text HTML as part of the processing loop shown in FIG. 3. The programmatic process goes through each site in the dataset comparing the constructed fingerprint of a site against the base fingerprint discussed above.

The text of the suspect website is reduced in exactly the same manner as described above.

<p> Fraudulent Bank website</p>
<img src="banklogo.jpg">
becomes:
"banklogo.jpg"

Again, this raw, reduced, data represent a single point of reference in a fingerprint. In this case, this relevant point of the suspect site fingerprint MATCHES a base fingerprint point in the example above for the same text. In this simplified case, as an example, since every fingerprint point of the suspect website fingerprint matches a point in the base website fingerprint, there is a 100% match and a 100% relevance score.

In a practical embodiment, each site is examined and a percentage score is computed based on the number of matches in the two arrays of the suspect and base websites. Of course, since more than one relevant point is normally used, the possible percent relevance score can be other than 0 and 100%. In example embodiments, the list of suspect websites is then sorted (by percentage) and displayed to an analyst, who may review the data, possibly starting with the highest scoring sites first. FIG. 4 shows an example pseudo-code listing, 400, of "function fingerprint($url)" that performs the fingerprint portion of an example process of the invention as just described.

Figure 5:
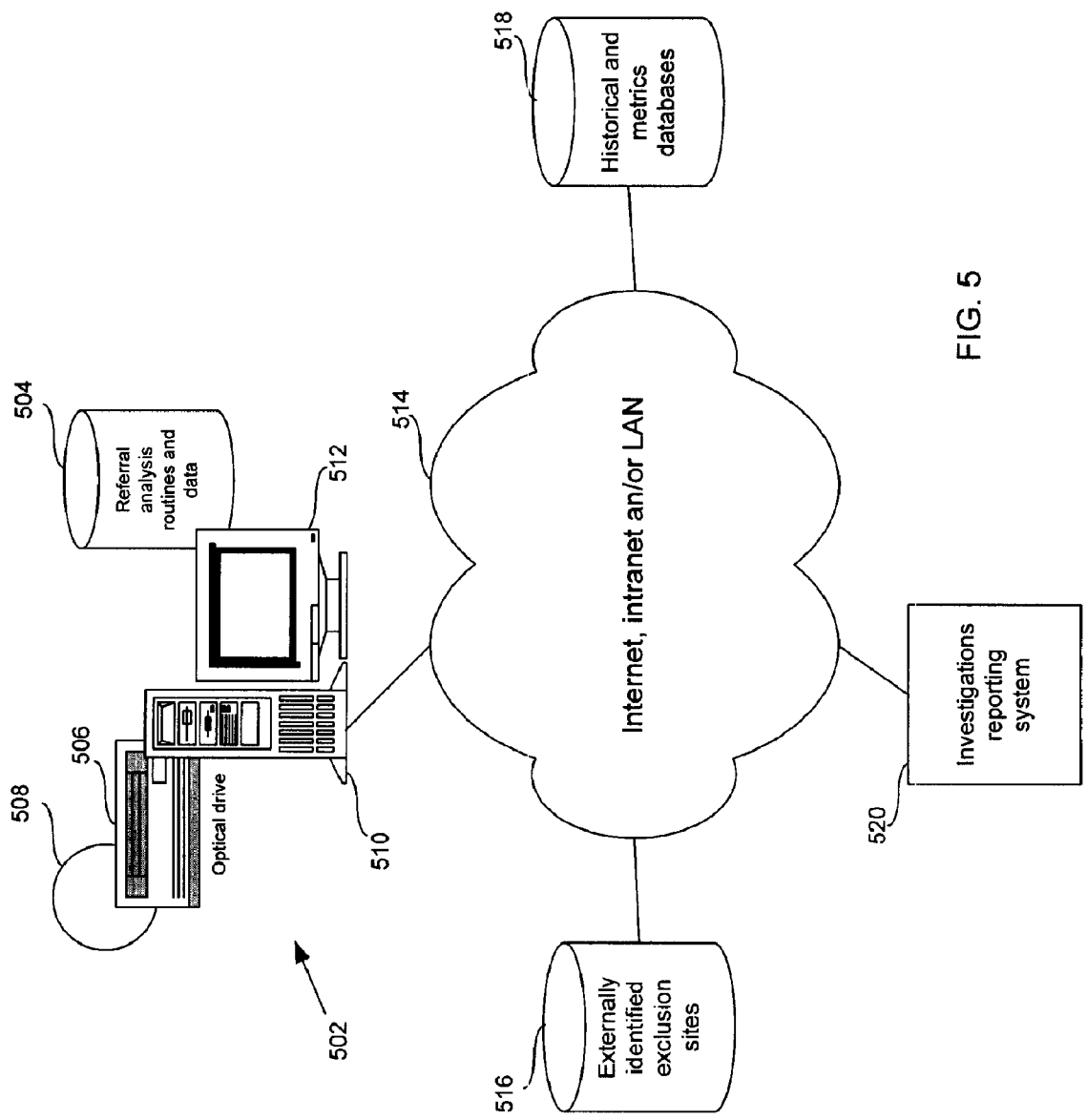
FIG. 5 is a network block diagram illustrating one example operating environment of the invention.

FIG. 5 illustrates a typical operating environment for embodiments of the present invention. System 502 can include workstation, personal computer, server, or similar computing platform. The system includes a fixed storage medium, illustrated graphically at 504, for storing programs and/or data which enable the use of an embodiment of the invention. In a typical installation, storage medium 504 includes the computer program instructions to carry out the website referral analysis, fingerprinting, etc. It may also include one or more of the databases needed. In this particular example, an optical drive, 506, is also connected to the computing system for loading the appropriate computer program product into system 502 from an optical disk, 508. The computer program product includes a computer program or programs with instructions for carrying out the methods of the invention. Computing platform 510 can execute the appropriate instructions and display appropriate screens on display device 512, for example, the listing of suspect websites with relevance scores. Reports and metric data can also be stored on storage medium 504, or written out to a removable medium.

FIG. 5 also illustrates how the system of the invention can be connected to external systems, as discussed previously with respect to FIG. 1. The connection to the appropriate databases or data stores can be formed in part by network 514, which can be an intranet, local area network (LAN) connection, or any other type, or a combination, of network resources, including the Internet. Data needed to run the appropriate analysis can be maintained in one or more data stores or databases, such as database 516 of externally identified "known good sites" to be excluded, and database 518 of historical information and metrics. Data may reside in part on these networked resources and in part in system 502. It is also possible to set up a system in which everything needed is self-contained in system 502, and the Internet connection is only used to retrieve referring site hits as they occur. In the example of FIG. 5, network 518 also provides a connection to external investigations and reporting system 520.

In any case, a computer program which implements all or parts of the invention through the use of systems like those illustrated in FIG. 5 can take the form of a computer program product residing on a computer usable or computer readable storage medium. Note that the "medium" may also be a stream of information being retrieved when a processing platform or execution system downloads the computer program instructions through the Internet or any other type of network. Computer program instructions which implement the invention can reside on or in any medium that can contain, store, communicate, propagate or transport the program for use by or in connection with any instruction execution system, apparatus, or device. Such a medium may be, for example, but is not limited to, an electronic, magnetic, optical, electromagnetic, or semiconductor system, apparatus, device, or network. Note that the computer usable or computer readable medium could even be paper or another suitable medium upon which the program is printed, as the program can then be electronically captured from the paper and then compiled, interpreted, or otherwise processed in a suitable manner.

Specific embodiments of an invention are described herein. One of ordinary skill in the computing and networking arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

What is claimed is:

1. A computer-implemented method of facilitating detection of phishing-related websites from among a plurality of referring websites, the method comprising:
   accessing a referral list of websites that link to a legitimate website;
   calculating statistical outliers within the referral list of websites based on historical patterns to produce a dataset of suspect websites from the referral list of websites;
   creating an array of relevant points wherein each relevant point corresponds to a defined HTML tag to construct a referring site fingerprint for each of the suspect websites in the dataset based on content of a suspect website;
   comparing each referring site fingerprint to a fingerprint for the legitimate website by determining the number of matches between the array of relevant points and a second array forming the fingerprint for the legitimate website to calculate a relevance score using a percentage match between the referring site fingerprint and the fingerprint for the legitimate website, the relevance score indicating a likelihood that the suspect website is a phishing-related website; and
   presenting the relevance score for each of the suspect websites.

2. The computer-implemented method of claim 1 wherein the producing of the dataset of suspect websites further comprises:
   discarding known good websites from the referral list of websites.

3. The computer-implemented method of claim 1 further comprising sorting and displaying the relevance score for each of the suspect websites.

4. The computer-implemented method of claim 2 further comprising sorting and displaying the relevance score for each of the suspect websites.

5. A computer program product including at least one of a magnetic, optical and semiconductor computer-readable storage medium comprising a computer program for facilitating detection of phishing-related websites from among a plurality of referring websites, the computer program further comprising:
   instructions for accessing a referral list of websites that link to a legitimate website;
   instructions for calculating statistical outliers within the referral list of websites based on historical patterns to produce a dataset of suspect websites from the referral list of websites;
   instructions for creating an array of relevant points wherein each relevant point corresponds to a defined HTML tag to construct a referring site fingerprint for a suspect website, the referring site fingerprint based on content of the suspect website;
   instructions for comparing the referring site fingerprint to a fingerprint for the legitimate website by determining the number of matches between the array of relevant points and a second array forming the fingerprint for the legitimate website to calculate a relevance score using a percentage match between the referring site fingerprint and the fingerprint for the legitimate website, the relevance score indicating a likelihood that the suspect website is a phishing-related website; and instructions for presenting the relevance score for each of the suspect websites.

6. The computer program product of claim 5 wherein the computer program further comprises:
instructions for discarding known good websites from the referral list of websites.

7. The computer program product of claim 5 wherein the computer program further comprises instructions for sorting and displaying the relevance score for each of the suspect websites.

8. The computer program product of claim 6 wherein the computer program further comprises instructions for sorting and displaying the relevance score for each of the suspect websites.

9. Apparatus for facilitating detection of phishing-related websites from among a plurality of referring websites, the apparatus comprising:
means for accessing a referral list of websites that link to a legitimate website;
means for calculating statistical outliers within the referral list of websites based on historical patterns to produce a dataset of suspect websites from the referral list of websites;
means for creating an array of relevant points wherein each relevant point corresponds to a defined HTML tag to construct a referring site fingerprint for a suspect website, the referring site fingerprint based on content of the suspect website;
means for comparing each referring site fingerprint to a fingerprint for the legitimate website by determining the number of matches between the array of relevant points and a second array forming the fingerprint for the legitimate website to calculate a relevance score using a percentage match between the referring site fingerprint and the fingerprint for the legitimate website, the relevance score indicating a likelihood that the suspect website is a phishing-related website; and
means for presenting the relevance score for each of the suspect websites.

10. The apparatus of claim 9 further comprising:
means for discarding known good websites from the referral list of websites.

11. The apparatus of claim 9 further comprising means for sorting and displaying the relevance score for each of the suspect websites.

12. The apparatus of claim 10 further comprising means for sorting and displaying the relevance score for each of the suspect websites.

13. A system for facilitating detection of phishing-related websites from among a plurality of referring websites, the system comprising:
a data reduction function to access a referral log of websites that link to a legitimate website and to discard known good websites;
a data repository to store information on historical patterns of website access;
a data qualification function linked to the data repository and to the data reduction function, the data qualification function to compute statistical outliers from the referral log to produce a dataset of suspect websites; and
a prioritization and comparison function linked to the data reduction function and the data qualification function to construct a referring site fingerprint for a suspect website and to compare the referring site fingerprint to a fingerprint for the legitimate website by determining the number of matches between the array of relevant points and a second array forming the fingerprint for the legitimate website to calculate a relevance score using a percentage match between the referring site fingerprint and the fingerprint for the legitimate website and to present the relevance score for each of the suspect websites indicating a likelihood that the suspect website is a phishing-related website.

14. The system of claim 13 further comprising a web services element to provide presentation and feedback.

15. The system of claim 13 further comprising an interface to an investigations reporting system.

16. The system of claim 15 further comprising an interface to a metrics and historical data reporting system.

17. The system of claim 14 further comprising an interface to an investigations reporting system.

18. The system of claim 17 further comprising an interface to a metrics and historical data reporting system.

* * * * *